US008103716B2

(12) United States Patent
Boyce et al.

(10) Patent No.: US 8,103,716 B2
(45) Date of Patent: Jan. 24, 2012

(54) METHODS AND SYSTEMS FOR FORWARDING AN ITEM TO AN ALTERNATIVE ADDRESS

(75) Inventors: John H. Boyce, Collierville, TN (US); David J. Payne, Collierville, TN (US)

(73) Assignee: United States Postal Service, Washington, DC (US)

( * ) Notice: Subject to any disclaimer, the term of this patent is extended or adjusted under 35 U.S.C. 154(b) by 1152 days.

(21) Appl. No.: 10/953,583

(22) Filed: Sep. 30, 2004

(65) Prior Publication Data

US 2005/0251285 A1    Nov. 10, 2005

Related U.S. Application Data

(60) Provisional application No. 60/568,370, filed on May 5, 2004.

(51) Int. Cl.
G06F 15/16    (2006.01)
(52) U.S. Cl. ......... 709/203; 709/225; 709/227; 705/401
(58) Field of Classification Search .................. 709/225, 709/227, 229, 224, 206; 455/90.2; 370/354; 705/401; 358/1.15
See application file for complete search history.

(56) References Cited

U.S. PATENT DOCUMENTS

| 5,420,403 | A | | 5/1995 | Allum et al. | |
|---|---|---|---|---|---|
| 5,602,743 | A | * | 2/1997 | Freytag | 705/408 |
| 6,178,411 | B1 | * | 1/2001 | Reiter | 705/408 |
| 6,330,590 | B1 | * | 12/2001 | Cotten | 709/206 |
| 6,542,933 | B1 | * | 4/2003 | Durst et al. | 709/229 |
| 6,763,226 | B1 | * | 7/2004 | McZeal, Jr. | 455/90.2 |
| 6,826,548 | B2 | * | 11/2004 | Hungerpiller et al. | 705/401 |
| 6,944,863 | B1 | * | 9/2005 | Ward et al. | 719/310 |
| 7,128,270 | B2 | * | 10/2006 | Silverbrook et al. | 235/472.01 |
| 7,207,481 | B2 | * | 4/2007 | Barenburg et al. | 235/381 |
| 7,301,658 | B2 | * | 11/2007 | Henry | 358/1.15 |
| 7,693,942 | B2 | * | 4/2010 | Nale | 709/206 |
| 2002/0120582 | A1 | * | 8/2002 | Elston et al. | 705/64 |
| 2002/0123904 | A1 | * | 9/2002 | Amengual et al. | 705/1 |
| 2003/0097331 | A1 | * | 5/2003 | Cohen | 705/39 |
| 2003/0144969 | A1 | * | 7/2003 | Coyne | 705/400 |
| 2004/0008368 | A1 | * | 1/2004 | Plunkett et al. | 358/1.15 |
| 2004/0134690 | A1 | * | 7/2004 | Norris et al. | 178/19.01 |
| 2005/0254091 | A1 | * | 11/2005 | Cranitch et al. | 358/1.18 |
| 2005/0259658 | A1 | * | 11/2005 | Logan et al. | 370/392 |

OTHER PUBLICATIONS

International Search Report for International Appln. No. PCT/US04/31959 filed Sep. 30, 2004.

* cited by examiner

*Primary Examiner* — Khanh Dinh
(74) *Attorney, Agent, or Firm* — Finnegan, Henderson, Farabow, Garrett & Dunner, L.L.P.

(57) ABSTRACT

Systems and methods for forwarding an item in a delivery system may comprise scanning a first address label on an item to produce scan data and converting the scan data into first address data. Furthermore, systems and methods for forwarding the item may comprise determining if an alternative address exists in a change of address database, the alternative address corresponding to the captured first address data. Moreover, systems and methods for forwarding the item may comprise forwarding the item to a location corresponding to the alternative address if it was determined that the alternative address exists in the change of address database.

28 Claims, 5 Drawing Sheets

METHODS AND SYSTEMS FOR FORWARDING AN ITEM TO AN ALTERNATIVE ADDRESS

RELATED APPLICATIONS

This application claims the benefit of U.S. Provisional Patent Application No. 60/568,370, entitled "Methods and Systems for Forwarding an Item," which was filed on May 5, 2004, the disclosure of which is hereby expressly incorporated herein by reference.

TECHNICAL FIELD

The present invention generally relates to forwarding an item. More particularly, the present invention relates to forwarding an item based upon image data taken from the item and processed using a forwarding software module.

BACKGROUND

The United States Postal Service (USPS) is an independent government agency that provides delivery of mail and other services to the public. The USPS is widely recognized as a safe and reliable means for sending and receiving mail and other items. With the advent and steady growth of electronic mail and electronic commerce, the physical mail stream will increasingly be utilized for sending and receiving packages and other items.

The USPS processes and delivers billions of items each year. The efficiency of the USPS, and other delivery services, may be impacted when items are undeliverable due to item recipients changing their addresses. Undeliverable items of this type may cost delivery system operators millions of dollars in additional handling costs each year. Items that are likely candidates for forwarding may comprise, for example, subscription service items such as book items, wine club items, or gift items directed to a recipient for Christmas, a birthday, or an anniversary.

The aforementioned inefficiencies are created when a delivery system operator must forward an undeliverable item. Accordingly, efficiently forwarding items to an alternate address remains an elusive goal. Thus, there remains a need for efficiently forwarding an item in a delivery system. In addition, there remains a need for efficiently forwarding an item in a delivery system based upon image data taken from the item and processed using a forwarding software module.

SUMMARY

Consistent with embodiments of the present invention, systems and methods are disclosed for forwarding an item. Systems and methods for forwarding an item in a delivery system may comprise scanning a first address label on an item to produce scan data and converting the scan data into first address data. Furthermore, systems and methods for forwarding the item may comprise determining if an alternative address exists in a change of address database, the alternative address corresponding to the captured first address data. Moreover, systems and methods for forwarding the item may comprise forwarding the item to a location corresponding to the alternative address if it was determined that the alternative address exists in the change of address database.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with the invention may forward an item to a delivery point. For example, an embodiment of the invention may capture address images, including name and location information, and a parcel identifier or other tracking indicia (a barcode, for example) from items using scanning technology. Optical character reading software may then be used to convert the address image, including a name, for example, to text and then convert the text to a standardized address. Using a forwarding software module, the resulting standardized address may then be compared to a change of address database comprising standardized addresses and their corresponding alternate addresses. The forwarding software module may provide the alternate address. The item may then be re-identified by using the parcel identifier (barcode or other identifying mark or tracking indicia). Moreover, the item may be moved out of the normal delivery path to an alternative processing point so that the alternate address may be applied to the item.

Alternatively, the alternate address may be applied as part of the normal processing stream depending on the sophistication of the equipment in the delivery path. The alternate address may, for example, be applied via a new shipping label and affixed to the item or through inkjet-spraying onto the existing label. The aforementioned process may occur at any time during processing and transportation of the item through the delivery path or after an attempted delivery of the item to the old address. Notwithstanding, a greater savings may be realized by the delivery system operator through early detection in processing and transportation of the item in need of forwarding. Furthermore, the address data is not limited to data indicating location information, but may also, for example, include information specifying a recipient's name. Location information may include, for example, information reflective of a street address and/or information reflective of at least one of a city, state, country, and delivery code, such as a ZIP™ code.

Ancillary services may be offered back to the senders by providing a list of items that have been forwarded and a list of the alternate addresses associated with those items. These ancillary services may be offered to individuals or to large-volume package shippers and included in the rates. For individuals, this ancillary service may be linked, for example, to a delivery service provider's item tracking feature provided via the Internet. When the sender seeks information about the delivery status of the item, the address correction service may be offered at that time for a fee as a value added service. These services may lessen future occurrences of undeliverable items, including items undeliverable-as-addressed.

Consistent with embodiments of the invention, a delivery point may be a physical place to which a delivery service provider may deliver an item. A delivery point may be, for example, a street letterbox, a door slot, an apartment building box cluster, or a separate post office box. The aforementioned are exemplary, and delivery points may comprise any location where an item may be received. Furthermore, an item may comprise a mailpiece, a United States Postal Service Priority Mail package, a United States Postal Service Express Mail Package, or any other item to be delivered. The aforementioned are exemplary and the item may comprise any deliverable element.

An embodiment consistent with the invention may comprise a system for forwarding an item. The system may comprise a component configured for capturing first address data from the item, a component configured for determining if an alternative address exists in a change of address database, and a component configured for forwarding the item to a location corresponding to the alternative address. The component configured for capturing first address data may be further configured for scanning a first address label on the item to produce scan data and converting the scan data into the first address data. In addition, the component configured for forwarding the item to the location corresponding to the alternative address may be further configured for: i) transmitting a notice to a sender of the item, the notice indicating the alternative address; ii) receiving an indication that the sender of the item wants the items forwarded to the location corresponding to the alternative address; iii) receiving a fee from the sender of the item for forwarding the item; and iv) re-labeling the item with a second address label corresponding to the alternative address.

Any of the aforementioned components may either comprise or otherwise utilize a forwarding system 185. Forwarding system 185, as described below using FIG. 1 and FIG. 5, may comprise a memory storage for maintaining a database and a processing unit coupled to the memory storage. The processing unit may be operative to perform any one or more functions of the aforementioned components. Any suitable combination of hardware, software and/or firmware may be used to implement the memory, processing unit, or other components.

Figure 1:
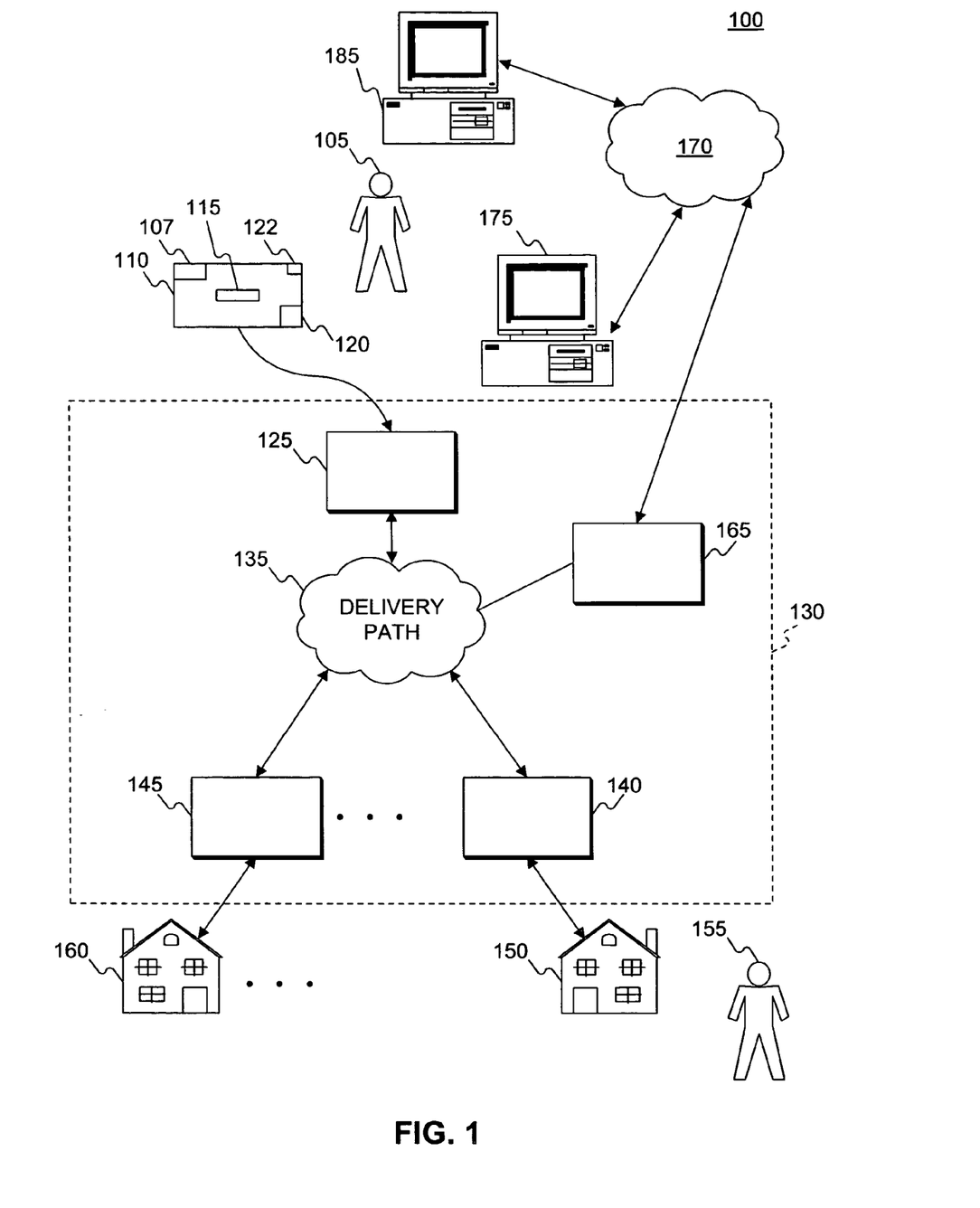
FIG. 1 is a block diagram of an exemplary item delivery system consistent with an embodiment of the present invention.

By way of a non-limiting example, FIG. 1 illustrates item delivery system 100 in which the features and principles of the present invention may be implemented. For example, a sender 105 may place an item 110 into a delivery system 130. Item 110 may contain a label 115 indicating a first address of a recipient 155 at a location 150, and a return address 107 indicating where to return item 110 if necessary. Item 110 may also contain a tracking indicia 120 relating, for example, sender 105 and recipient 155. Tracking indicia 120 may be placed on item 110 by sender 105 or the operator of delivery system 130.

Item 110 may be routed through delivery system 130, which may comprise a sender plant 125, a delivery path 135, a first address plant 140, an alternative address plant 145, and an alternative processing point 165. Delivery path 135 may comprise a plurality of plants similar to sender plant 125, first address plant 140, and alternative address plant 145. The plants within delivery path 135 may contain, among other things, automated systems and sorting equipment and are designed to receive and process a plurality of items. Moreover, the plants within delivery path 135 may contain optical character readers (OCRs) that may allow system 100 to read and convert address data to scan data in a digital format, for example. Delivery system 130 may be configured to sense tracking indicia 120 placed on item 110 as it passes through the elements of delivery system 130 directing the movement of item 110 through delivery system 130. System 100 may also include a network 170 as described in more detail below with respect to FIG. 5. Any or all of the systems or components of system 100 may communicate using network 170.

Tracking indicia 120 may comprise a bar code or a PLANET code, to be described below. A bar code is a printed code used for recognition by a bar code scanner (reader). Traditional one-dimensional bar codes use the width of the bar to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, system operators sorted flat mail using POSTNET, a 12-digit barcode consisting of alternating long and short bars indicating the destination of, for example, a mailpiece. Responding to the expanding needs of users, particularly high volume users, the PLANET code was developed on the foundation of the existing technical infrastructure. The PLANET code is the opposite of the POSTNET code, reversing long bars for short and short bars for long. This innovation offers the convenience of a bar code that is easily applied using current bar-coding methods, and is readily scanned by the high-speed automation equipment already located in the plurality of plants comprising delivery system 130.

Item 110 may be sent through delivery system 130 by sender 105 to first address plant 140. At any time in the delivery process a determination may be made as to whether item 110 is undeliverable (including undeliverable-as-addressed.) If it is determined that item 110 is undeliverable-as-addressed, item 110 may be forwarded to alternative processing point 165 where an ancillary service may be performed. Examples of such ancillary services may include recycle service (treating item 110 as waste), NIXIE service, and Computerized Forwarding Service (CFS).

With respect to NIXIE service, NIXIE is a classification given to an item that cannot be sorted or is undeliverable-as-addressed because of an incorrect, illegible, or insufficient delivery address. If item 110 is undeliverable-as-addressed, address correction service (re-label with a correct address) or return service (return item to the sender) may be performed. In this case, a NIXIE operator specialized in the handling of such items may be required. If item 110 requires return service, return address 107 on item 110 is read and item 110 is sent to return address 107 accordingly. Return address 107 is an element of item 110 that is usually placed in the upper left corner of item 110 to indicate the address of sender 105. This address indicates where sender 105 wants item 110 returned if it is undeliverable (including undeliverable-as-addressed.) In addition, return address 107 may indicate where sender 105 will receive a bill for any fees due for the return of item 110. When item 110 requires address correction service, a NIXIE operator may obtain the proper address of recipient 155 or the reason for non-delivery. While NIXIE processing may comprise address correction service or return service, other types of NIXIE processing may be performed.

Computerized forwarding service may be a centralized, computerized address label-generating operation that forwards undeliverable-as-addressed items to recipients using, for example, forwarding system 185. In this case, recipient 155 may pre-register, with the delivery system operator, an alternative address location 160 of recipient 155 in order to have all items forwarded to alternative address location 160. For example, if recipient 155 moves and wishes to have items sent to alternative address location 160, recipient 155 may notify the delivery system operator of alternative address location 160. Once the delivery system operator is notified of alternative address location 160, all items sent to the first address at location 150 may be detected by delivery system 130, re-labeled, and then forwarded to alternative address location 160. In the aforementioned computerized forwarding service, items may be forwarded only for a specific period of time. The delivery system operator may expect recipient 155 to contact each and every sender who recipient 155 may expect to receive an item and notify the possible senders of the address change of recipient 155. After the computerized forwarding service time period is complete, the delivery system operator may cease forwarding items to recipient 155 and may return to the sender 105 all items sent to location 150.

If ancillary services were required, item 110 may remain at alternative processing point 165 or may be processed at an item recovery section of alternative processing point 165. Item 110 may be recovered by sender 105 or recipient 155 upon the completion of a "tracer." A tracer is a form completed by sender 105 or recipient 155 to locate delayed or undelivered items (including items undeliverable-as-addressed.) While item recovery may occur at alternative processing point 165, other types of processing may be performed at alternative processing point 165.

While forwarding system 185 is shown to be separate from delivery system 130, the functionality of forwarding system 185 may be performed under the control of the delivery system operator at alternative processing point 165, at any point within delivery system 130, or at any point outside delivery system 130. Moreover, the functionality of forwarding system 185 may be performed by an enterprise not under the control of the delivery system operator. Moreover, the delivery system operator may communicate over network 170 with sender system 175 operated by sender 105.

Figure 2:
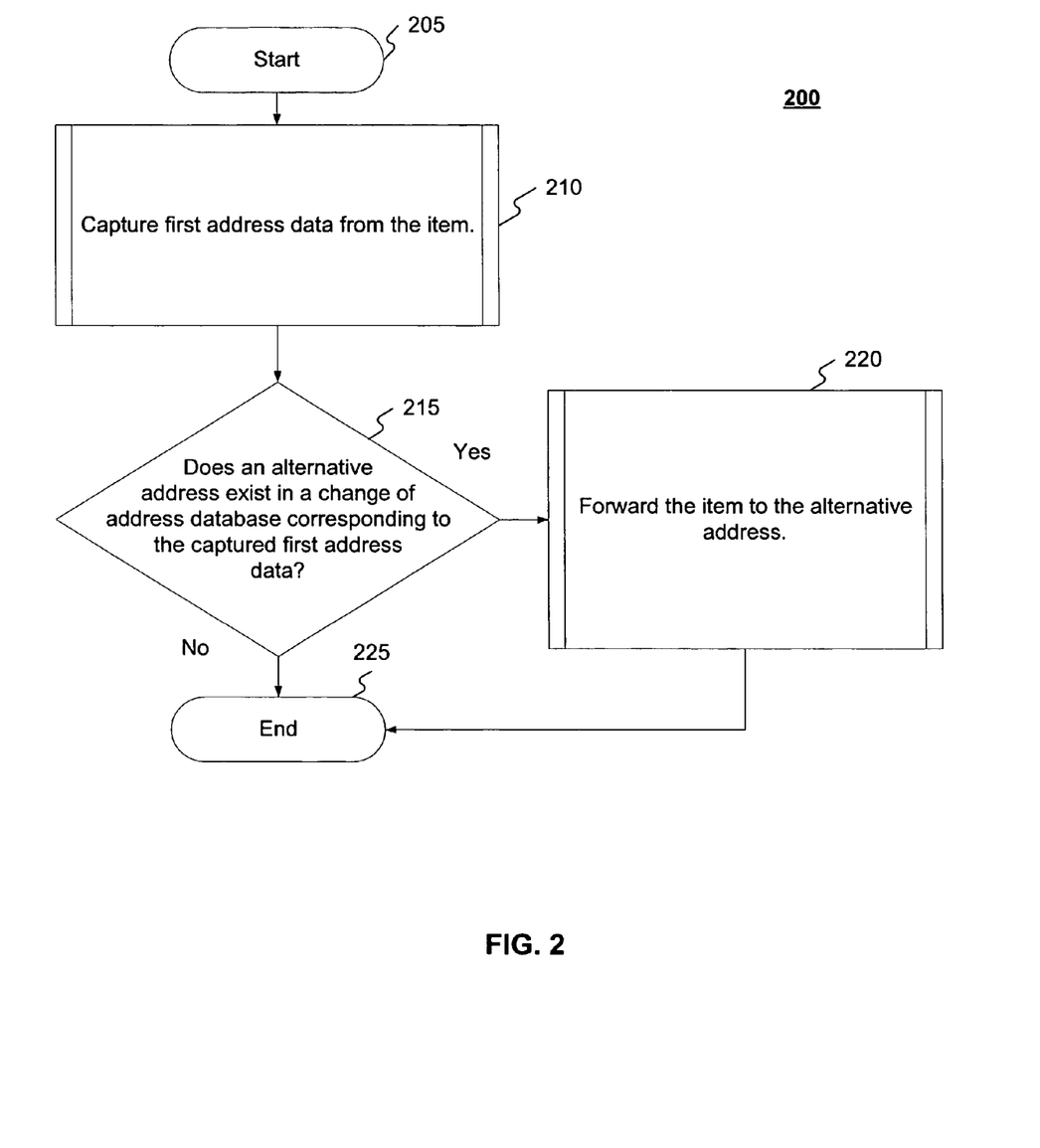
FIG. 2 is a flow chart of an exemplary method for forwarding an item consistent with an embodiment of the present invention.

FIG. 2 is a flow chart setting forth the general stages involved in an exemplary method 200 consistent with the invention for forwarding an item using system 100 of FIG. 1. Exemplary ways to implement the stages of exemplary method 200 will be described in greater detail below. Exemplary method 200 may begin at starting block 205 and proceed to exemplary subroutine 210 where system 100 may capture a first address data from item 110. Exemplary ways to implement the stages of exemplary subroutine 210 will be described in greater detail below with respect to FIG. 3.

Figure 5:
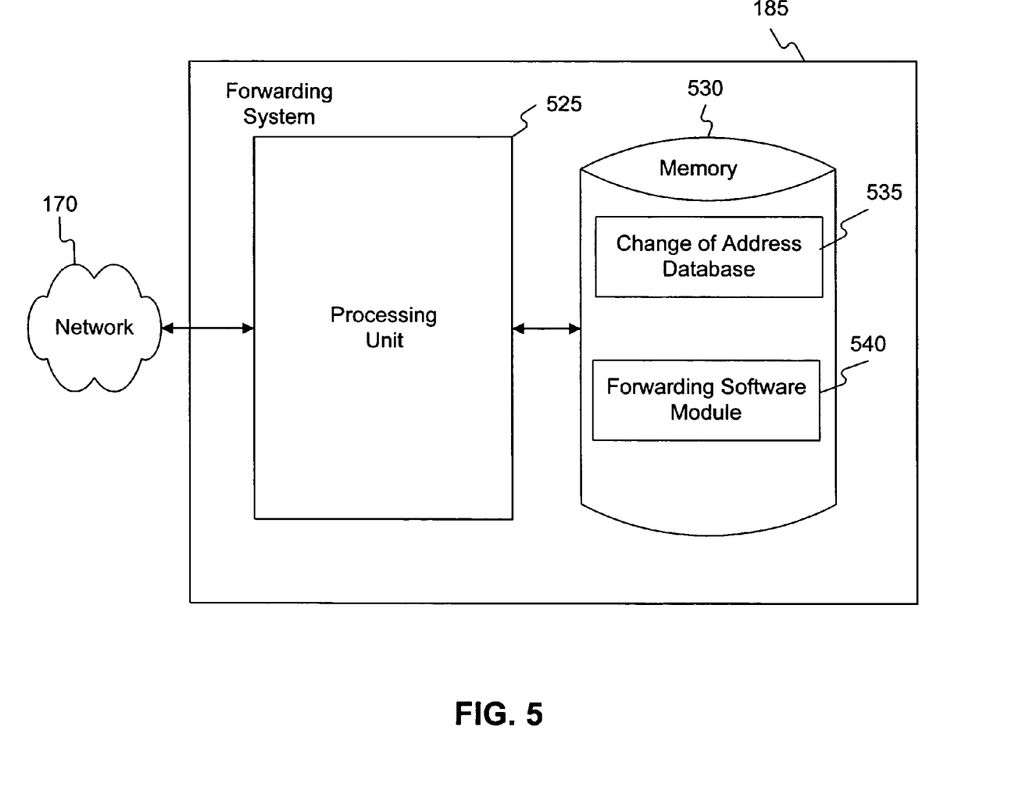
FIG. 5 is a block diagram of an exemplary forwarding system consistent with an embodiment of the present invention.

From exemplary subroutine 210, exemplary method 200 may proceed to decision block 215 where system 100 may determine if an alternative address exists in a change of address database 535 (FIG. 5) corresponding to the captured first address data. Change of address database 535 may be located in a memory 530 of forwarding system 185, as shown in FIG. 5, or alternatively may be located at a component remote from forwarding system 185. As described in more detail in FIG. 5 below, processing unit 525 may execute forwarding software module 540. Accordingly, processing unit 525 may determine if an alternative address exists in change of address database 535 corresponding to the captured first address data.

From decision block 215, if system 100 determines that an alternative address exists in change of address database 535, exemplary method 200 may proceed to exemplary subroutine 220 where system 100 may forward item 110 to alternative address location 160. Exemplary ways to implement the stages of exemplary subroutine 220 will be described in greater detail below with respect to FIG. 4. Exemplary method 200 may end at stage 225.

Figure 3:
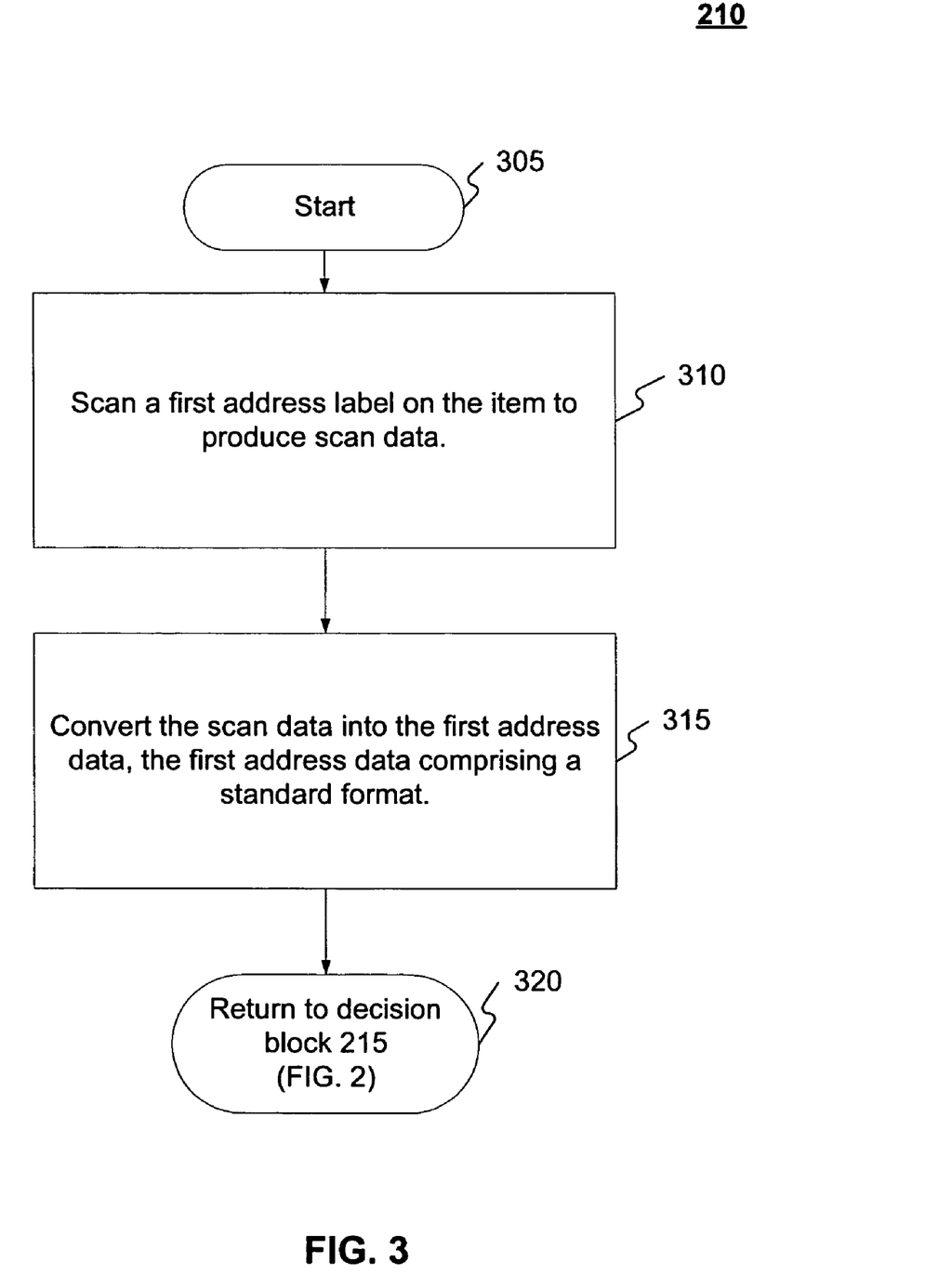
FIG. 3 is a flow chart of an exemplary subroutine used in the exemplary method of FIG. 2 for capturing a first address data consistent with an embodiment of the present invention.

FIG. 3 describes exemplary subroutine 210 from FIG. 2 for capturing first address data from item 110. Exemplary subroutine 210 begins at starting block 305 and proceeds to stage 310 where system 100 may scan first address label 115 on item 110 to produce scan data. For example, any or each component in delivery system 130 may be equipped with optical character readers (OCRs) that may allow system 100 to read and convert address data to scan data in a digital format. The scan data may be transmitted from delivery system 130 to forwarding system 185 over network 170.

From stage 310, where system 100 scans first address label 115 on item 110 to produce scan data, exemplary subroutine 210 may advance to stage 315 where system 100 may convert the scan data into the first address data. For example, the scan data may be converted into the first address data by, for example, any component in delivery system 130 or forwarding system 185. Exemplary subroutine 210 may then continue to stage 320 and return to decision block 215 of FIG. 2.

Figure 4:
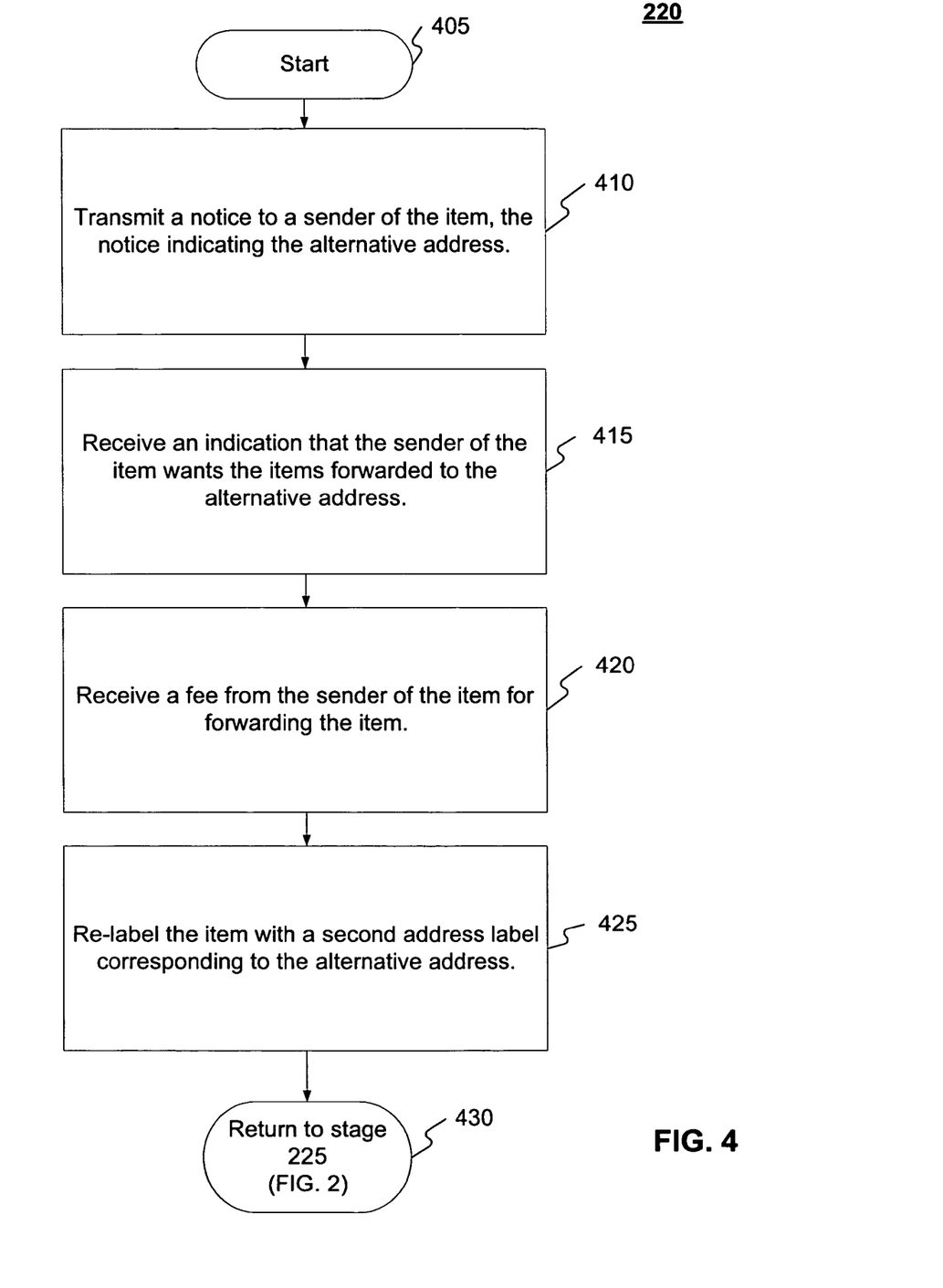
FIG. 4 is a flow chart of an exemplary subroutine used in the exemplary method of FIG. 2 for forwarding an item consistent with an embodiment of the present invention.

FIG. 4 describes exemplary subroutine 220 from FIG. 2 for forwarding item 110 to alternative address location 160. Exemplary subroutine 220 begins at starting block 405 and proceeds to stage 410 where system 100 may transmit a notice to sender 105 of item 110. The notice may the indicate alternative address. For example, forwarding system 185 may forward the notice to sender system 175 over network 170.

Exemplary subroutine 220 may then advance to stage 415 where system 100 may receive an indication that sender 105 of item 110 wants item 110 forwarded to alternative address location 160. For example, forwarding system 185 may receive the indication from sender 105 using sender system 175 over network 170.

Once system 100 receives the indication that sender 105 of item 110 wants item 110 forwarded to alternative address location 160 in stage 415, exemplary subroutine 220 may continue to stage 420 where system 100 may receive a fee from sender 105 of item 110 for forwarding item 110. For example, forwarding system may receive the fee electronically from sender 105 via sender system 175 over network 170.

Exemplary subroutine 220 may then proceed to stage 425 where system 100 may re-label item 110 with a second address label corresponding to alternative address location 160. For example, forwarding system 185 may forward data necessary to create the second address label over network 170 to a desired component of delivery system 130. The component that receives the data necessary to create the second address label may create the second address label and place it on item 110. After system 100 re-labels item 110 with the second address label corresponding to alternative address 160 in stage 425, exemplary subroutine 220 may continue to stage 430 and returns to stage 225 of FIG. 2.

As shown in FIG. 5, forwarding system 185 may comprise a memory storage for maintaining a database and a processing unit coupled to the memory storage. The memory, processing unit, or other components of system 185. Forwarding system 185 is only exemplary and other systems and processors may comprise the aforementioned memory, processing unit, or other components, consistent with embodiments of the present invention.

Furthermore, any system or component of the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

As illustrated in the block diagram of FIG. 5, system 185 may include a processing unit 525 and a memory 530. Memory 530 may include a forwarding software module 540 and change of address database 535. Forwarding software module 540 may comprise instructions which, when executed by processing unit 525, cause processing unit 525 to implement the method of FIGS. 2-4. Forwarding software module 540 may be stored on a computer readable medium and loaded into 530.

System 185 or any other processor or component included in system 100 ("the processors"), may be implemented using a personal computer, network computer, mainframe, or other similar microcomputer-based workstation. The processors may be implemented in any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 170 may comprise, for example, a local area network (LAN) or a wide area network (WAN). Such networking environments are commonplace in offices, enterprise-wide computer networks, intranets, and the Internet, and are known by those skilled in the art. When a LAN is used as network 170, a network interface located at any of the processors may be used to interconnect any of the processors. When network 170 is implemented in a WAN networking environment, such as the Internet, the processors may typically include an internal or external modem (not shown) or other means for establishing communications over the WAN. Further, in utilizing network 170, data sent over network 170 may be encrypted to insure data security by using known encryption/decryption techniques.

In addition to utilizing a wire line communications system as network 170, a wireless communications system, or a combination of wire line and wireless may be utilized as network 170 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 170. These methods and processes may include, but are not limited to, transferring data via, diskette, CD ROM, facsimile, conventional mail, an interactive voice response system (IVR), or via voice over a publicly switched telephone network.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for forwarding an item, comprising:

scanning a first address label on an item to produce scan data;

converting the scan data into first address data corresponding to a physical address;

determining whether an alternative address for the first address data exists in a change of address database, based on a determination that the item is undeliverable to a location corresponding to the first address data and before making an attempt to deliver the item to the physical address;

forwarding the item to a location corresponding to the alternative address when it is determined that the alternative address exists in the change of address database, wherein forwarding the item to the location corresponding to the alternative address comprises:

transmitting a notice to a sender of the item, the notice indicating the existence of the alternative address and a first fee for forwarding the item to the alternative address;

receiving, in a response to the notice, an indication that the sender of the item wants the item forwarded to the location corresponding to the alternative address and the first fee;

after receiving the indication and first fee, generating a second address label corresponding to the alternative address and physically placing the second address label on the item; and delivering the item to the location corresponding to the alternative address without returning the item to the sender; and after the item is forwarded, providing information related to the alternative address to the sender for a second fee.

2. The method of claim 1, wherein the first address data comprises location information.

3. The method of claim 1, wherein the first address data comprises location information and name information.

4. The method of claim 1, wherein physically placing the second address label on the item comprises:
printing the alternative address on top of the first address label corresponding to the first address data.

5. The method of claim 1, further comprising:
providing the sender of the item with a list of one or more items sent by the sender that have been forwarded and alternate addresses corresponding to locations to which the items have been forwarded.

6. The method of claim 1, further comprising:
capturing item identification information from the item.

7. The method of claim 6, wherein the item identification information comprises a barcode.

8. A system for forwarding an item, comprising:
means for scanning a first address label on an item to produce scan data;
means for converting the scan data into first address data corresponding to a physical address;
means for determining whether an alternative address for the first address data exists in a change of address database, based on a determination that the item is undeliverable to a location corresponding to the first address data and before making an attempt to deliver the item to the physical address;
means for forwarding the item to a location corresponding to the alternative address when it is determined that the alternative address exists in the change of address database, wherein the means for forwarding the item to the location corresponding to the alternative address comprises:
means for transmitting a notice to a sender of the item, the notice indicating the existence of the alternative address and a first fee for forwarding the item to the alternative address;
means for receiving, in a response to the notice, an indication that the sender of the item wants the item forwarded to the location corresponding to the alternative address and the first fee;
means for generating, after receiving the indication and first fee, a second address label corresponding to the alternative address and means for physically placing the second address label on the item; and
means for delivering the item to the location corresponding to the alternative address without returning the item to the sender; and
means for providing, after the item is forwarded, information related to the alternative address to the sender for a second fee.

9. The system of claim 8, wherein the first address data comprises location information.

10. The system of claim 8, wherein the first address data comprises location information and name information.

11. The system of claim 8, wherein means for physically placing the second address label on the item comprises:
means for printing the alternative address on top of the first address label corresponding to the first address data.

12. The system of claim 8, further comprising:
means for providing the sender of the item with a list of one or more items sent by the sender that have been forwarded and alternate addresses corresponding to locations to which the items have been forwarded.

13. The system of claim 8, further comprising:
means for capturing item identification information from the item.

14. The system of claim 13, wherein the item identification information comprises a barcode.

15. A non-transitory computer-readable medium containing instructions for performing a method for forwarding an item, the method comprising:
converting scan data produced from a first address label on an item into first address data corresponding to a physical address;
determining whether an alternative address for the first address data exists in a change of address database, based on a determination that the item is undeliverable to a location corresponding to the first address data and before making an attempt to deliver the item to the physical address;
forwarding the item to a location corresponding to the alternative address when it is determined that the alternative address exists in the change of address database, wherein forwarding the item to the location corresponding to the alternative address comprises:
transmitting a notice to a sender of the item, the notice indicating the existence of the alternative address and a first fee for forwarding the item to the alternative address;
receiving an indication, in response to the notice, that the sender of the item wants the item forwarded to the location corresponding to the alternative address and the first fee;
after receiving the indication and first fee, generating a second address label corresponding to the alternative address and physically placing the second address label on the item; and
delivering the item to the location corresponding to the alternative address without returning the item to the sender; and
after the item is forwarded, providing information related to the alternative address to the sender for a second fee.

16. The computer-readable medium of claim 15, wherein the first address data comprises location information.

17. The computer-readable medium of claim 15, wherein the first address data comprises location information and name information.

18. The computer-readable medium of claim 15, wherein physically placing the second address label on the item comprises:
printing the alternative address on top of the first address label corresponding to the first address data.

19. The computer-readable medium of claim 15, further comprising:
providing the sender of the item with a list of one or more items sent by the sender that have been forwarded and alternate addresses corresponding to locations to which the items have been forwarded.

20. The computer-readable medium of claim 15, wherein item identification information is captured from the item.

21. The computer-readable medium of claim 20, wherein the item identification information comprises a barcode.

22. An apparatus for forwarding an item, comprising:
a memory having a program that:
converts scan data produced from a first address label on an item into first address data corresponding to a physical address;

determines whether an alternative address for the first address data-exists in a change of address database, based on a determination that the item is undeliverable to a location corresponding to the first address data and before making an attempt to deliver the item to the physical address;

transmits a notice to a sender of the item, the notice indicating the existence of the alternative address and a first fee for forwarding the item to the alternative address, receives an indication, in response to the notice, that the sender of the item wants the item forwarded to a location corresponding to the alternative address and the first fee;

after receiving the indication and fee, generates a second address label corresponding to the alternative address and physically places the second address label on the item;

forwards the item to the location corresponding to the alternative address without returning the item to the sender; and after the item is forwarded, provides information related to the alternative address to the sender for a second fee; and a processor that runs the program.

23. The apparatus of claim 22, wherein the first address data comprises location information.

24. The apparatus of claim 22, wherein the first address data comprises location information and name information.

25. The apparatus of claim 22, wherein the program that physically places the second address label on the item comprises:

a program that prints the alternative address on top of the first address label corresponding to the first address data.

26. The apparatus of claim 22, wherein the sender of the item is provided with a list of one or more items sent by the sender that have been forwarded and alternate addresses corresponding to locations to which the items have been forwarded.

27. The apparatus of claim 22, wherein item identification information is captured from the item.

28. The apparatus of claim 27, wherein the item identification information comprises a barcode.

* * * * *